UNITED STATES PATENT OFFICE.

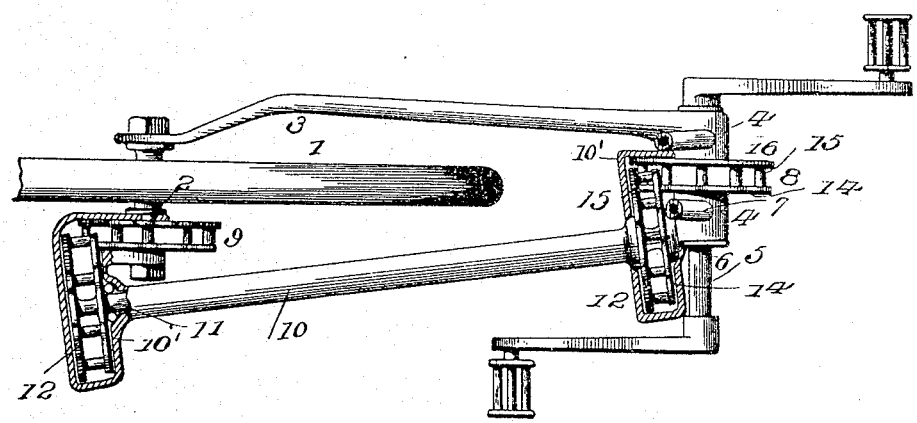
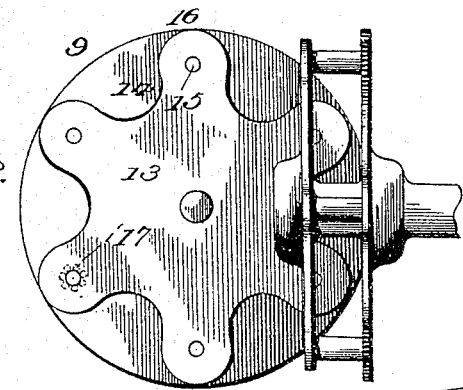
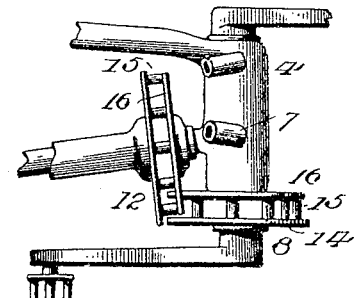
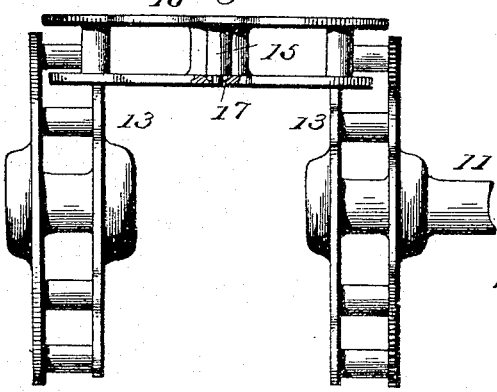

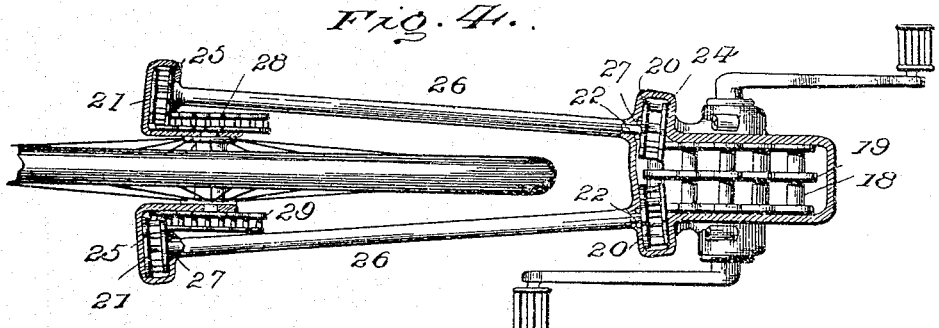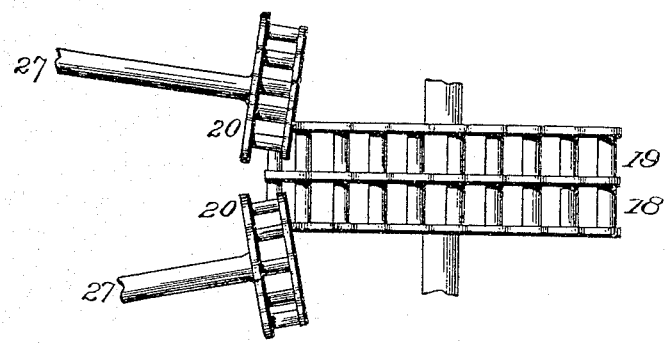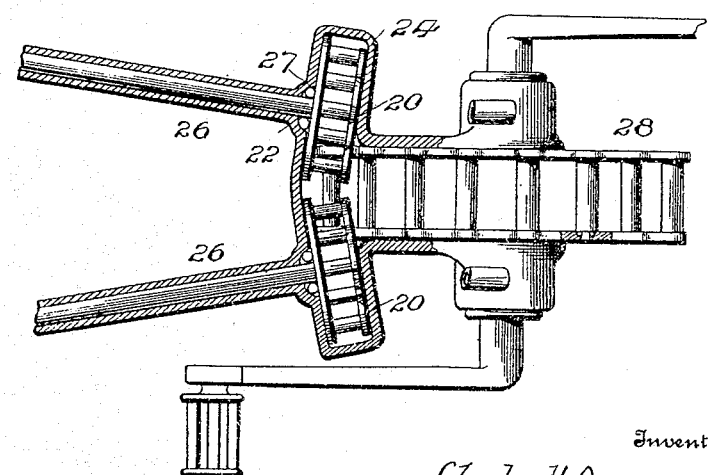

CHARLES HERBERT OCUMPAUGH, OF ROCHESTER, NEW YORK.

GEARING.

No. 800,670.        Specification of Letters Patent.        Patented Oct. 3, 1905.

Application filed April 12, 1898. Serial No. 677,348.

*To all whom it may concern:*

Be it known that I, CHARLES HERBERT OCUMPAUGH, a resident of Rochester, in the county of Monroe and State of New York, have invented certain new and useful Improvements in Gearing; and I do hereby declare the following to be a full, clear, and exact description of the invention, such as will enable others skilled in the art to which it pertains to make and use the same.

The invention relates to gearing, and has for its object to provide gearing of special form, whereby great strength, small friction, freedom of movement, and certainty of proper connection are secured.

The invention consists in the construction hereinafter described and pointed out.

In the accompanying drawings, Figure 1 is a partial plan of a bicycle with the improvement applied thereto. Fig. 2 is an elevation of two lantern-wheels in mesh, and Fig. 3 is a plan showing three wheels in mesh.

Numeral 1 denotes the rear wheel of a bicycle, and 2 its hub. Said hub is connected by a bar 3 to a pedal-shaft bearing 4. A pedal-shaft is denoted by 5, and 6 also denotes a bearing for the shaft. These bearings are supported by the members 7 of a frame-fork. (Partially shown in Fig. 1.)

8 denotes a lantern-wheel fixed to the pedal-shaft, and 9 is a similar wheel fixed to the hub 2.

10' denotes a casing loosely connected to hub 2 and continuous with a tube or tubular bar 10 to shaft-bearings 4 and 6.

11 is a shaft inclosed by the tubular bar 10 and carrying at its ends lantern-wheels 12 and 13, respectively.

The heads of the lantern-wheels are scalloped or cut away, as indicated at 14. (See Fig. 2.) Rollers 15 connect two heads, joining the exterior portions 16 of their peripheries. These rollers preferably have antifriction ball-bearings, as indicated at 17 in Figs. 2 and 3.

The contiguous scalloped heads of two pairs of lantern-wheels are similar, and when suitably disposed to be operated, as indicated, their rollers engage each other successively and transmit power from the crank-shaft to the bicycle-wheel. The object of cutting away the lantern-heads at regular intervals and between the rollers is to permit each peripheral projection 16 on one wheel-head to pass between two projections on the adjacent head of the other wheel, whereby the contiguous rollers, one of each wheel, may be engaged to transmit power. The engagement of the rollers can be secured with great certainty, and it is not easily affected by wear nor by any slight distortion of the connections.

The end thrust of the tubular shaft is spent on the rollers, and if it should happen in any case to be sufficient to cause the projections to have a meshing contact with each other no serious interference with transmission of power will occur.

Although the meshing lantern-wheels have been shown applied to a bicycle and are very suitable and particularly designed for the purpose, their use is not in all cases limited to such machines.

It is obvious that but one head in each wheel need be scalloped in the case illustrated in Fig. 1; but both heads may be so formed, and manifestly the construction is not limited to the coöperation of two wheels, and two or more wheels might be arranged to mesh in a similar manner with a single wheel, as indicated in Fig. 3.

The lantern-wheel is easily manufactured and has great strength. They can be made so that the rollers will engage each other without the nicety of workmanship required in ordinary bevel and spur gears, and their meshing or engagement is not so easily impaired.

The rollers, each supported or journaled in two heads, are more securely held than are pins and are less likely to get out of repair, and they permit greater freedom of movement lengthwise one upon another.

The angular arrangement shown in Fig. 1 can be used, or the wheels may be situated in planes at right angles to each other, as illustrated in Figs. 2 and 3.

In the modification illustrated in Fig. 4 there is shown fixed to the crank-shaft a double lantern-wheel 18, having a partition or diaphragm 19, in which are journaled two sets of rollers, their outer ends being journaled in the heads of the wheel. 20 and 21 indicate lantern-wheels fixed to the opposite ends of shaft 22, each revolubly supported in casings 24 and 25 and inclosed by a tube 26, connecting the casings by means of interposed shaft-bearings 27. The rear wheels 21 mesh with the rear side of wheels 28 and 29, fixed on the bicycle-hub and inclosed by a casing 25. In Fig. 6 a similar construction is indicated on an enlarged scale, a single lantern-wheel 8 being substituted for the double wheel shown in Fig. 4.

It is not essential that the side shaft be inclosed in parts of the frame nor that they inclose parts of the frame. Neither are the casings essential, nor in all cases the combination of a wheel on the crank-shaft with two side shafts.

If the lantern-wheels be carried by a tube inclosing and turning on a fixed part of the frame, such tube will have suitable length and the gears a proper arrangement—as, for example, wheel 8 would be arranged to mesh with wheel 12 on the outer side of the latter, as indicated in Fig. 7.

The improvement is not limited to a particular dimension. Lantern-wheels on the side shaft having eight rollers have been successfully used with a hub-wheel having fourteen rollers and a shaft-wheel having thirty-seven rollers, each roller in the several wheels having a diameter of about five-sixteenths of an inch and a length of about one-half an inch. The shaft-wheels were about two inches in diameter, the hub-wheel about three and one-half inches in diameter, and the crank-wheel about eight inches. Preferably the rollers will be arranged at right angles to each other, though small variations will not be a substantial departure from the improvement. A variation has been indicated in several figures of the drawings, but in an exaggerated manner, it being obvious that in practice such variation would be slight in operatively connecting the pedal and wheel shafts. The described angular disposition of the rollers obviates end thrust on the shafts, and the improvement effects a large diminution in friction as compared with ordinary gears, whether provided with rollers or not. In such construction there is little lost and the rollers are always in mesh, though the wheels are arranged at any one of various angles one to the other.

The head of each wheel is scalloped or cut away so that its edge does not extend beyond the circumference of the roller throughout a distance equal to at least a semicircumference of a roller.

It is not essential that the rollers be made of uniform area in cross-section throughout their length, and they may be made either convex or concave in form lengthwise.

By the construction above described it will be seen that the meshing lantern-wheels are capable of a great variety of angular adjustments—that is to say, that the angle of one lantern-wheel with relation to the other lantern-wheel with which it meshes may be varied considerably without interfering with the complete and positive operation of the wheels. This would not be the case were the meshing wheels other than true lantern-wheels having the rollers at a right angle to the heads. Therefore my invention is to be distinguished from constructions in which the rollers of the meshing wheels are at any angle to the head other than a right angle, for the reason that in such wheels the angle of the rollers determines the relative position (or angle) of the intermeshing parts of the adjacent or coöperating wheel. Neither would angular adjustment, such as provided for by the present improvement, be practicable in case of approximately cone-shaped intermeshing teeth, for the reason that a slight variation in the angle of either wheel would cause narrower portions of the teeth to engage, resulting in a loss of power, while a small additional increase of the angle would throw them entirely out of engagement, and, further, such teeth are necessarily supported at one end only and cannot be used in lantern-wheels.

It will be noticed that by forming the scallops 14 of greater width than the diameter of the rollers a greater variation in the angular relation of the meshing lantern-wheels is provided for, as the meshing rollers are thereby permitted to pass into operative position at a greater inclination to each other.

I am aware that wheels having roller-teeth have been combined with each other and that a bevel gear-wheel fixed on a crank-axle has been made to mesh with a wheel having roller-teeth. My improvement is characterized by a construction comprising a lantern-wheel fixed on an axle having roller-teeth parallel to said axle and combined and arranged so that the rollers mesh with the roller-teeth of one or more similar secondary wheels, the construction being such that it provides for an operative situation of a secondary wheel at any angle with respect to the axle through a range of more than one hundred and ninety degrees without alteration of the axle-wheel substantially as indicated in the several figures of the drawings.

Having described my invention, what I claim is—

1. A driving-shaft, a lantern-wheel comprising plates having freely-rotatable rollers supported to turn in said plates, a drive shaft, and a similar lantern-wheel mounted thereon, the rollers of each wheel being parallel to its shaft and the shafts arranged at an angle to each other.

2. A driving-shaft, a lantern-wheel with two series of freely-rotatable rollers and three plates in which said rollers are journaled, the middle plate supporting the proximal ends of both series, a pair of driven shafts and lantern-wheels operatively engaged by the rollers of the wheel first named.

3. A driving-shaft, a lantern-wheel comprising plates and freely-rotatable rollers supported to turn in said plates, a drive shaft, and a similar lantern-wheel mounted thereon, the rollers of each wheel being parallel to its shaft and the shafts arranged at angle to each other, the diametric planes of the wheels inclosing less than a right angle.

4. A driving-shaft, a lantern-wheel comprising plates and two series of freely-rotatable rollers, a pair of driven shafts, and a like lantern-wheel mounted on each of the pair of shafts, the rollers of said latter wheels being operatively engaged by the rollers of the first-named wheel and the diametric planes of each of the driven wheels making less than a right angle with the driving-shaft.

5. A pedal-shaft, a centrally-situated driving lantern-wheel comprising plates and two series of freely-rotatable rollers, a pair of driven shafts, a lantern-wheel carried by each of said shafts and provided with freely-rotatable rollers operatively engaged by those of the first-named wheel, and an axle, said driven shafts being geared to the axle.

6. The combination of a driving-shaft, a lantern-wheel comprising parallel plates and freely-rotatable rollers supported to turn in said plates, and a like driven lantern-wheel, the rollers of each wheel being disposed at an angle to the coacting rollers of the other.

In testimony whereof I have signed this specification in the presence of two subscribing witnesses.

CHARLES HERBERT OCUMPAUGH.

Witnesses:
STEPHEN ZIELINSKI,
GEORGE A. GILLETTE.